United States Patent
McMahon

[15] 3,704,930
[45] Dec. 5, 1972

[54] MICRO-HOLOGRAPHIC RECORDING AND READING APPARATUS

[72] Inventor: Donald H. McMahon, Carlisle, Mass.

[73] Assignee: Sperry Rand Corporation

[22] Filed: March 31, 1971

[21] Appl. No.: 129,737

[52] U.S. Cl. ..................................350/3.5, 353/7
[51] Int. Cl. ..................................G02b 27/22
[58] Field of Search ..................350/3.5; 353/7

[56] References Cited

OTHER PUBLICATIONS

Kock et al., 54 Proc. IEEE 1985 (12/1966).
Meier, 55 J. Opt. Soc'y Am., 987–992, (8/1965).
Vitols, 8 IBM Tech. Disc. Bull., 1581–1583, (4/1966).
Bowman, 7 Applied Optics, 2280–2284, (11/1968).

Primary Examiner—David Schonberg
Assistant Examiner—Robert L. Sherman
Attorney—S. C. Yeaton

[57] ABSTRACT

Micro-holographic Fourier transform recorder apparatus arranged and constructed so as to provide, with suitable reader apparatus reproduced images of a sufficient size for direct viewing and compensated for aberration and laser speckle. The recorder includes means for providing an enlarged image of the transparency to be recorded prior to making the hologram whereby an enlarged image is produced on reconstruction. The appearance of laser speckle is eliminated in the reader apparatus by means of an appropriate vibratory motion applied to the diffusing screen on which the image is presented.

10 Claims, 2 Drawing Figures

MICRO-HOLOGRAPHIC RECORDING AND READING APPARATUS

BACKGROUND OF THE INVENTION

1. Field of the Invention

The present invention relates to micro-holography and more particularly to micro-holographic recording particularly adapted to reduction of conventional microfilm or other comparably small recordings in a manner to obtain enlarged images suitable for direct viewing upon reconstruction with compatible apparatus.

2. Description of the Prior Art

For the past several decades reduction of information for storage purposes has typically been performed on microfilm utilizing conventional photographic imaging techniques. Reduction ratios of about 20 to 1 became more or less standard as a compromise between conveniently realizable storage densities and legible information retrieval. Larger de-magnification ratios are readily achievable, of course, for small scale operations, but for general utility in applications involving large quantities of data the amount of reduction is limited by various reliability factors relating to the mechanical focusing tolerances of step and repeat recording techniques, unavailability of inexpensive high quality lenses, and dust or other film imperfections which seriously degrade the recorded and reproduced images.

One recently developed technique capable of storage at reduction ratios in excess of one hundred to one utilizes an intermediate step wherein the reduced images are first recorded on a photochromic material and then contact transferred to a photographic film. The photochromic images are visible in ordinary light and therefore susceptible to inspection so that imperfect recordings can be erased and re-recorded prior to transferral to the film.

Holography offers another means for increasing the image reduction ratios and has the advantage of providing certain beneficial features not obtainable with conventional photographic method, for example insensitivity to localized imperfections on the hologram. Moreover, by utilizing Fourier transform techniques the recording process can be rendered insensitive to positional variations of the input information in a plane transverse to the recording light beam. In addition, by storing the information in the form of Fourier transforms, both the transverse positioning and viewing focus are made less critical when retrieving data for reading purposes.

The present invention is particularly concerned with a holographic recording apparatus for reducing the size of microfilm transparencies (typically about three centimeters square) to an area on the order of approximately one to two millimeters square in readiness for subsequent readout characterized by bright, high contrast images of sufficient size for direct viewing without the need for magnifying elements and their concommitant focusing problems.

SUMMARY OF THE INVENTION

A preferred recording apparatus of the present invention comprises a conventional Fourier transform holographic recorder modified in a manner to cause the signal beam bearing data to be recorded to form an enlarged image of the data prior to being focused on the holographic plate, whereby upon reconstruction of the recorded wavefront, in a reader apparatus, the resulting image will be sufficiently large for direct viewing. In further explanation of the preceding comment, it will be appreciated that if a microfilm transparency is directly recorded as a Fourier transform, the image obtained on reconstruction will be of the same size as the original transparency unless magnified in some way. The magnification may be obtained holographically, as will be explained subsequently, but only to a certain degree if holographic aberrations are not to degrade image resolution. Alternatively, magnifying elements such as lenses may be incorporated in the reader apparatus, but this is considered economically undesirable. In any case, it will be recognized that there is a tradeoff between storage density and the subsequent magnification required to obtain reproduced images of suitable size for direct reading. High storage density is obtained when the transparency image subtends a large solid angle relative to the hologram. This requires that a microfilm size transparency be placed only a few centimeters from the hologram. An arrangement of this sort, however, introduces considerable aberration in the reconstructed images. Considerable aberration also occurs in the case where large holographic magnification is employed. In general, if a high storage density is achieved with direct Fourier transform recording from the microfilm transparency, the amount of magnification required in the reader will be too high to be accomplished without introducing intolerable aberration in the reproduced images. These problems are minimized with a recorder constructed according to the principles of the present invention. More specifically, regarding the structure of the recorder, the microfilm transparency, of which a reduced size holographic recording is to be made, is positioned in the path of a converging beam which is diffracted by the transparency to form a signal beam. A lens positioned at the focal plane of the converging beam receives the diffracted signal beam and refracts it to form an enlarged image of the transparency at which location another lens is positioned to focus the image light onto the holographic plate in superposed relation with a coherently related reference beam. Rapid convergence compatible with high storage density of the enlarged image data is permissible since similar enlarged images will be produced without holographic magnification upon reconstruction of the holographically stored data. Further holographic magnification can be produced by altering the convergence of the reference beam. Aberrations produced in this instance by the holographic magnification are reduced when the enlarged image is located more remote from the hologram. The data from a plurality of microfilm transparencies are recorded side by side in a similar fashion to obtain a two-dimensional holographic array.

A real image of the data contained in any selected hologram of the array may be simply produced in a reader apparatus by illuminating the hologram with an identical reference beam directed oppositely to that used for recording. The read image appears at the location of the enlarged image plane of the recording apparatus, is the same size as the recorded image, and is presented on a diffuser screen positioned thereat. A Fresnel lens positioned immediately in front of the diffuser in the path of the reconstructed light wave enhances the image brightness and contrast. In addition to the foregoing components, the reader also includes a mechanism for dithering the diffuser screen in a direction parallel to its major surfaces for eliminating the appearance of laser speckle and thereby providing for increased legibility and more comfortable viewing.

Other innovative features of the recorder and reader apparatus will be discussed in the subsequent detailed description of the invention.

DESCRIPTION OF THE PREFERRED EMBODIMENT

Figure 1:
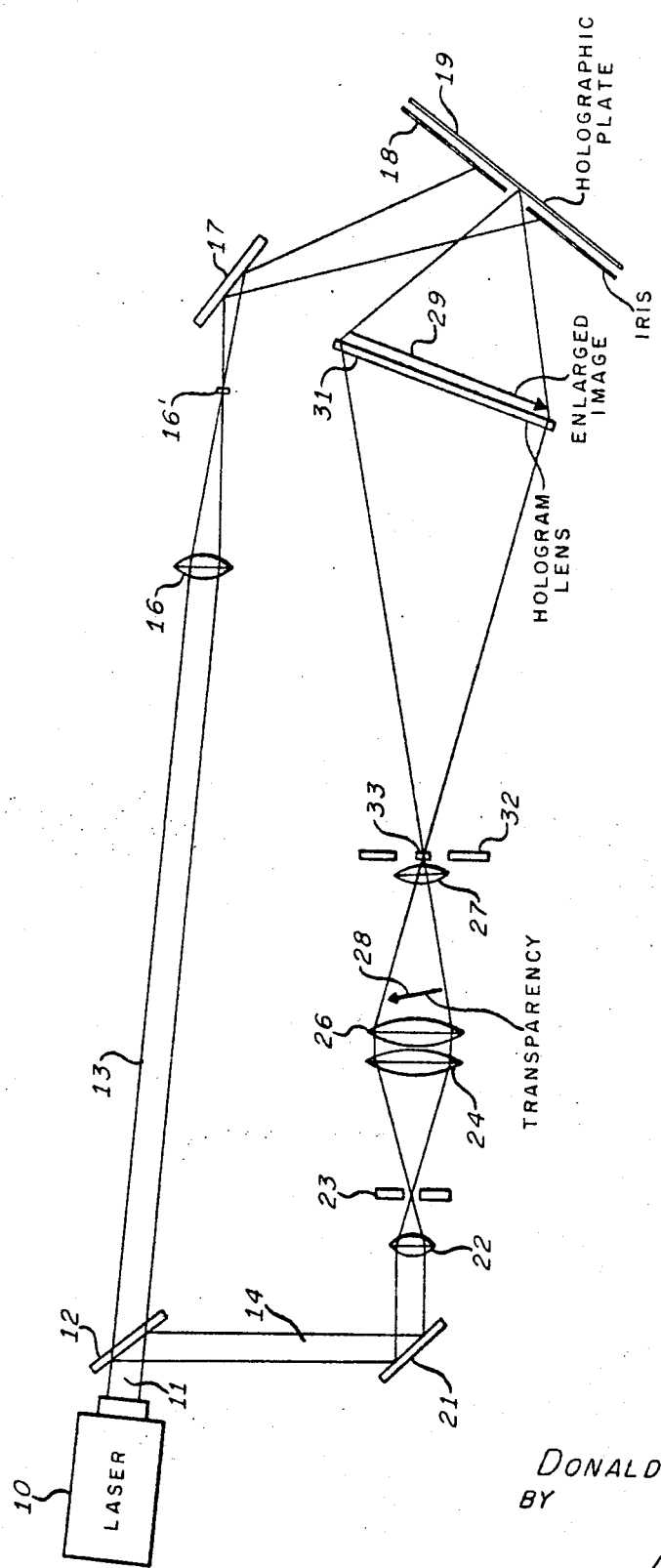
FIG. 1 is a schematic side view illustration of a preferred micro-holographic recorder apparatus embodying the principles of the present invention.

Referring to FIG. 1, the recording apparatus comprises a laser 10 which emits a light beam 11 directed toward beam splitter 12 where it is divided into reference and signal beams 13 and 14, respectively. The reference beam propagates through converging lens 16, reflects from mirror 17 and passes through the aperture in iris 18 onto the photosensitive surface of holographic film plate 19. The signal beam meantime reflects from mirror 21 onto lens 22 which focuses the beam through a central pin hole aperture in plate 23. Lens 22 and the aperture in plate 23 function cooperatively to provide a point source of light compensated for imperfections in the optical components disposed in the path of the light beam up to this point. Lens 24 collects and collimates the light emanating from the pin hole aperture while lens 26 in turn converges the collimated light to a point located near the center of lens 27. A microfilm transparency, designated by arrow 28, is positioned in the path of the converging signal beam adjacent lens 26 and beyond the front focal plane of lens 27 whereby an enlarged image of the transparency, designated by arrow 29, is formed at the location of hologram lens 31. Mask 32, which has a centralized opaque stop 33 positioned along the optical axis of the signal beam serves to block the undiffracted light transmitted through the microfilm transparency and thereby enhances the contrast of the image produced at the location of holographic lens 31. The stop 33 should be positioned at the focal point of lens 26; positioning of lens 27 is not as critical. Any ordinary converging lens could be used in place of the holographic lens or in combination therewith but a simple inexpensive hologram lens is generally suitable when used with monochromatic laser light for the intended purpose of rapidly converging the image light through iris 18 to focus on the holographic film in superposed relation with the reference beam incident thereon. Interference between the signal and reference beams thus produces a Fourier transform hologram representative of the information contained on the microfilm transparency. For best results with regard to resolution of the images reproduced from the recordings, it is advisable to arrange for the intensities of the signal and reference beams in the information containing portion of the hologram to be approximately equal upon striking the holographic plate.

It will be noted that a Fourier transform of the transparency data is also formed at the focal plane of lens 26, that is, at the location of zero order stop 33. Consequently, the Fourier transform hologram representative of the transparency could have been produced simply by locating the holographic film at the position of lens 27 and directing the reference beam to interfere with the signal beam at that point. If the recording had been made in this manner, however, it will be appreciated that the image produced upon reconstruction would be of the same size as the original microfilm transparency, about three centimeter squared, which is unsatisfactory for reading a journal size page. Some degree of magnification could be achieved, of course, with conventional lenses or by means of holographic techniques but not in an amount sufficient for practical use without introducing severe aberrations. In any event, by inserting lens 27 at the location of the diffraction pattern of the transparency, an enlarged image 29 is provided which, provided the convergence of the reference beam is unaltered, will be reproduced upon reconstruction of the wavefront data stored in the holographic film. High quality images may be obtained in this way in sizes on the order of about four by five inches as compared to the ½ by 2 centimeter dimensions of the microfilm transparency. Moreover, by inserting the pin point stop 33 to block the undiffracted light from the transparency, a considerable improvement in the contrast of the image is realized. Recording of a multiplicity of pages is accomplished in the foregoing manner simply by moving the holographic plate to position a discrete area behind the opening in the iris for each recording.

It will also be noted that the reference beam is slightly divergent when it strikes the holographic plate. This permits some degree of magnification to be achieved in the reproduced image simply by using a collimated reference beam in the reader apparatus. Specifically by way of example, if the focal point 16' of lens 16 is arranged to be spaced from the holographic plate by a distance equal to twice the spacing between the holographic plate and image 29, a two to one magnification will be obtained in a reader which uses a collimated reference beam.

Figure 2:
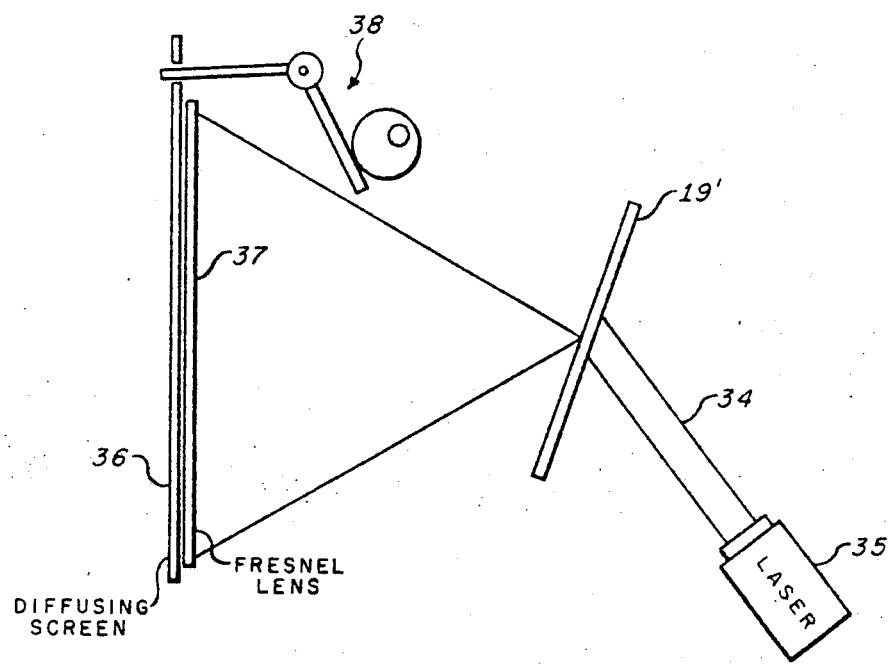
FIG. 2 is a schematic side view representation of a reader apparatus constructed in accordance with the present invention.

Reproduction of data stored holographically in the above described manner is accomplished with the reader apparatus of FIG. 2. A collimated reference beam 34 obtained from laser 35 and directed to impinge on holographic plate 19° on the side opposite to that used in recording causes the signal wavefront stored therein to be reconstructed whereupon an image, corresponding to the enlarged image of the recorder, is produced at the location of diffusing screen 36 which is spaced twice the distance from the hologram as was the recorder image 29. The reproduced image is twice the size of the enlarged recorder image 29 based on the previously mentioned spacings of the various components, and in the case of a 4 inch by 5 inch image at the hologram lens of the recorder will result in an 8 inch by 10 inch reader image, a convenient size for easy viewing. The two to one holographic magnification obtained by altering the convergence (or divergence) of the reproducing reference beam has been found quite satisfactory since only a small degree of aberration occurs under these conditions.

A Fresnel lens 37 positioned in the path of the reconstructed wavefront immediately in front of the diffusing screen focuses the light energy through the screen thereby enhancing the brightness and assuring uniform intensity of all parts of the readout image. In the absence of the Fresnel lens, the image light intensity would be seriously degraded in the case of an isotropic diffuser which scatters incident light fairly uniformly in all directions whereas for an anisotropic diffuser which concentrates the light in a cone of predetermined angle, the image brightness would be preserved but would tend to diminish if the viewer's eye moved slightly beyond the edge of the cone.

Positional tolerances are not critical in the reader. It is necessary merely to assure that the reference beam strikes only one hologram of the two dimensional array at any given time. Preferably, to yield maximum resolution of the image, the laser provided the reference beam should be operated in a single mode and at the same wavelength as used for recording.

Another problem which must be considered in the reader apparatus is that of laser speckle, a characteristic grainy pattern which causes considerable annoyance to the viewer by making the image pattern indistinct. Laser speckle is caused by random constructive or destructive interference of components of laser light from points located so close together on the diffusing screen as to be unresolvable by the eye. The speckle pattern can be broken up and appear to be eliminated by imparting motion to the diffusing screen so that the eye integrates the image pattern over a period of time. In the case of a diffuser consisting of troughs approximately 1 micron wide, the speckle can be eliminated if the screen is moved through this distance in less than one-fiftieth of a second. Hence, a screen motion of approximately one-tenth of a centimeter per second will generally be sufficient to eliminate speckle, although in some cases a higher rate may be required for one reason or another. This is accomplished in the reader apparatus by means of a vibratory mechanism 38 comprising a conventional cam and linkage arrangement coupled to the diffusion screen to cause it to oscillate up and down in a plane parallel to its major surfaces through an excursion of about one-half inch.

A few additional features of the recorder remain to be discussed. As indicated in FIG. 1, the holographic converging lens 31 is constructed so that its focal point is equidistant from each edge of the lens. This construction, although not essential, is nevertheless desirable since it minimizes field curvature in the reconstructed images. If the hologram lens is constructed to minimize field curvature, it must then be canted with respect to the optical axis of the incident signal beam because of the inherent nature of a hologram to produce a first order diffraction lobe displaced to the side of the optical axis. Once the foregoing conditions are established it also becomes desirable to cant the microfilm transparency with respect to the optical axis in a direction opposite to that of the hologram lens so that the enlarged transparency image lies in the same plane as the hologram lens. This arrangement will minimize distortion in the reconstructed images.

Regarding the microfilm transparencies, it is preferably that these be negatives wherein the information is presented by transparent regions of high transmissivity against an opaque background. This enables substantially all of the available light to appear in the information regions with very little light in the background of the reproduced images. Recordings can also be made from positive transparencies, but in that case the light will be concentrated in the background of the reproduced images thus causing the light to be distributed over a considerably larger area and thereby significantly reduce image brightness and contrast.

Finally, the preferred orientation of the reference beam and the holographic plate normal relative to the orientation of the transparency modulating the signal beam should be noted. From an analysis of holographic aberrations it can be shown that less astigmatism will occur in the reproduced images if the recorder is arranged so that the plane defined by the hologram normal and the reference beam is aligned parallel with the larger dimension of the enlarged image. Thus in the case of a 4 inch by 5 inch enlarged image, if the 4 inch dimension is perpendicular to the plane of the figure and the 5 inch dimension is in the plane of the figure, the reference beam should be directed in the plane of the figure so that it strikes the holographic plate from above or below the transparency image rather than from the side, with respect to the signal beam.

While the invention has been described in its preferred embodiment, it is to be understood that the words which have been used are words of description rather than limitation and that changes may be made within the purview of the appended claims without departing from the true spirit and scope of the invention in its broader aspects.

I claim:

1. A micro-holographic recording apparatus comprising
   light source means including a laser for directing a light beam through a transparency containing data which is to be recorded,
   first light focusing means positioned to collect light transmitted through the transparency and produce an enlarged image of the transparency,
   a holographic recording plate,
   second light focusing means positioned at the location of the enlarged image for converging the enlarged image onto said holographic recording plate, and
   means for directing a coherently related reference beam onto said holographic recording plate to interfere with the converged image light to produce a hologram of the transparency data.

2. The apparatus of claim 1 including means positioned in the path of the light transmitted through the transparency for blocking undiffracted light transmitted therethrough.

3. The apparatus of claim 1 wherein the enlarged image is of generally rectangular configuration and the plane of incidence of the coherently related beam on said holographic recording plate is aligned substantially parallel to the longer dimension of the enlarged image.

4. The apparatus of claim 1 wherein said second light focusing means comprises a holographic lens having a focal point equidistant from opposite edges of said holographic lens and is oriented so as to be canted with respect to the optical axis of the beam forming the enlarged image.

5. The apparatus of claim 4 including means for positioning the transparency so that it is canted with respect to the optical axis of the beam directed through the transparency so as to form the enlarged image in a plane superposed with said holographic lens.

6. The apparatus of claim 5 including means positioned in the path of the light transmitted through the transparency for blocking light which is not diffracted by the transparency.

7. The apparatus of claim 5 wherein the enlarged image is of generally rectangular configuration and the plane of incidence of the coherently related beam on said holographic recording plate is aligned parallel to the longer dimension of the enlarged image.

8. The apparatus of claim 7 including means positioned in the path of the light transmitted through the transparency for blocking light which is not diffracted by the transparency.

9. A micro-holographic recording apparatus comprising a microfilm transparency containing data to be recorded, light source means including a laser for directing a converging light beam through said transparency, first light focusing means located proximate the focal point of the converging beam for collecting the light transmitted through said transparency and producing an enlarged image thereof, second light focusing means positioned at the location of said enlarged image for converging the light contained therein, a holographic plate positioned at the focal plane of said second light focusing means for receiving said converging image light, and means for directing a coherently related reference beam onto said holographic plate to interfere therein with said converging image light to produce a hologram representative of the transparency data.

10. The apparatus of claim 9 wherein said second light focusing means comprises a holographic lens having a focal point equidistant from opposite edges of said holographic lens and is oriented so as to be canted with respect to the optical axis of the beam forming the enlarged image, and further including means for positioning the transparency so that it is canted with respect to the optical axis of the converging beam directed through the transparency so as to form the enlarged image in a plane superposed with said holographic lens.

* * * * *